United States Patent [19]
Harrison

[11] Patent Number: 5,878,222
[45] Date of Patent: Mar. 2, 1999

[54] METHOD AND APPARATUS FOR CONTROLLING VIDEO/AUDIO AND CHANNEL SELECTION FOR A COMMUNICATION SIGNAL BASED ON CHANNEL DATA INDICATIVE OF CHANNEL CONTENTS OF A SIGNAL

[75] Inventor: Edward R. Harrison, Beaverton, Oreg.

[73] Assignee: Intel Corporation, Santa Clara, Calif.

[21] Appl. No.: 889,117

[22] Filed: Jul. 7, 1997

Related U.S. Application Data

[63] Continuation of Ser. No. 626,389, Mar. 29, 1996, abandoned, which is a continuation of Ser. No. 338,429, Nov. 14, 1994, abandoned.

[51] Int. Cl.⁶ ................................................ G06F 17/00
[52] U.S. Cl. .................................................. 395/200.48
[58] Field of Search .......................... 395/200.47, 200.3, 395/200.33, 200.8, 200.48, 200.49

[56] References Cited

U.S. PATENT DOCUMENTS

| | | | |
|---|---|---|---|
| 4,630,108 | 12/1986 | Gomersall | 455/2 |
| 4,914,517 | 4/1990 | Duffield | 348/13 |
| 5,223,924 | 6/1993 | Strubbe . | |
| 5,323,240 | 6/1994 | Amano et al. . | |
| 5,390,027 | 2/1995 | Henmi et al. | 358/335 |
| 5,404,505 | 4/1995 | Levinson | 395/600 |
| 5,410,344 | 4/1995 | Graves et al. . | |
| 5,418,559 | 5/1995 | Blahut . | |
| 5,444,499 | 8/1995 | Saitoh . | |
| 5,465,113 | 11/1995 | Gilboy . | |
| 5,481,296 | 1/1996 | Cragun et al. . | |
| 5,517,652 | 5/1996 | Miyamoto et al. . | |
| 5,534,911 | 7/1996 | Levitan . | |
| 5,557,724 | 9/1996 | Sampat et al. . | |
| 5,561,457 | 10/1996 | Cragen et al. | 348/13 |
| 5,568,272 | 10/1996 | Levine | 348/13 |
| 5,579,055 | 11/1996 | Hamilton et al. | 348/476 |

OTHER PUBLICATIONS

Code of Federal Regulations, 47 CFR § 15.119, Parts 0–19, Oct. 1992, pp. 551–561.
Code of Federal Regulations, 47 CFR §73.682 & §73.699, Parts 70–79, Oct. 1992, pp. 192–197, 216–217, & 229.

*Primary Examiner*—Ellis B. Ramirez
*Attorney, Agent, or Firm*—Blakely, Sokoloff, Taylor & Zafman LLP

[57] ABSTRACT

A signal processing unit is provided with at least one analyzing unit to analyze channel data generated for a number of channels of a communication signal indicative of its channel contents to determine if channel contents of the channels are among channel contents defined by selection data. The signal processing unit is further provided with an arbitrating unit for arbitrating display and/or recording resource contentions among channels having channel contents that are defined by the selection data. The channel data may be texts, uniform resource locators, images as well as numeric data, and the like. The signal processing unit is suitable for incorporation in a stand-alone as well as a client computer system.

46 Claims, 8 Drawing Sheets

Personal Profile

Profile

| Priority | Channel | Trigger | Action |
|---|---|---|---|
| 1 | CNN | "War Started" or "President Dies" | Video ON, Audio ON, Maximize, Record |
| 2 | ESPN | "Cubs Win" | Video ON, Audio ON, Maximize |
| 3 | CNN | "Intel Corporation" | Record |
| 4 | CBS | "War Started" or "President Dies" | Video ON, Audio ON, Maximize, Record |
| 5 | CSPAN | "Balanced Budget" | Audio ON |
| 6 | CNN | "O.J. Simpson" | Audio OFF |

[Add-New]  [Delete]

[OK]  [Cancel]  [Hold]

FIG. 3A

USER INTERFACE FOR NUMBERIC CRITERIA, SUCH AS BASEBALL

| Priority | Channel | Trigger | Action |
|---|---|---|---|
| 1 | ESPN – 1 | Sport: Baseball<br>Criteria: Score<br>Team 1: > 5<br>Team 2: >5 | Video ON<br>Audio ON<br>Maximize |
| 2 | ESPN - 2 | Sport: Baseball<br>Criteria: Score<br>Team 1: > Team 2<br>Team 2: > Team 1<br>By: > 5 points | Video ON<br>Audio ON<br>Maximize |
| 3 | Prime Sports | Sport: Baseball<br>Criteria: Final Score<br>Team 1: Clubs >1 | Record |

[Add-New] [Delete]  [OK] [Cancel]

FIG. 3B

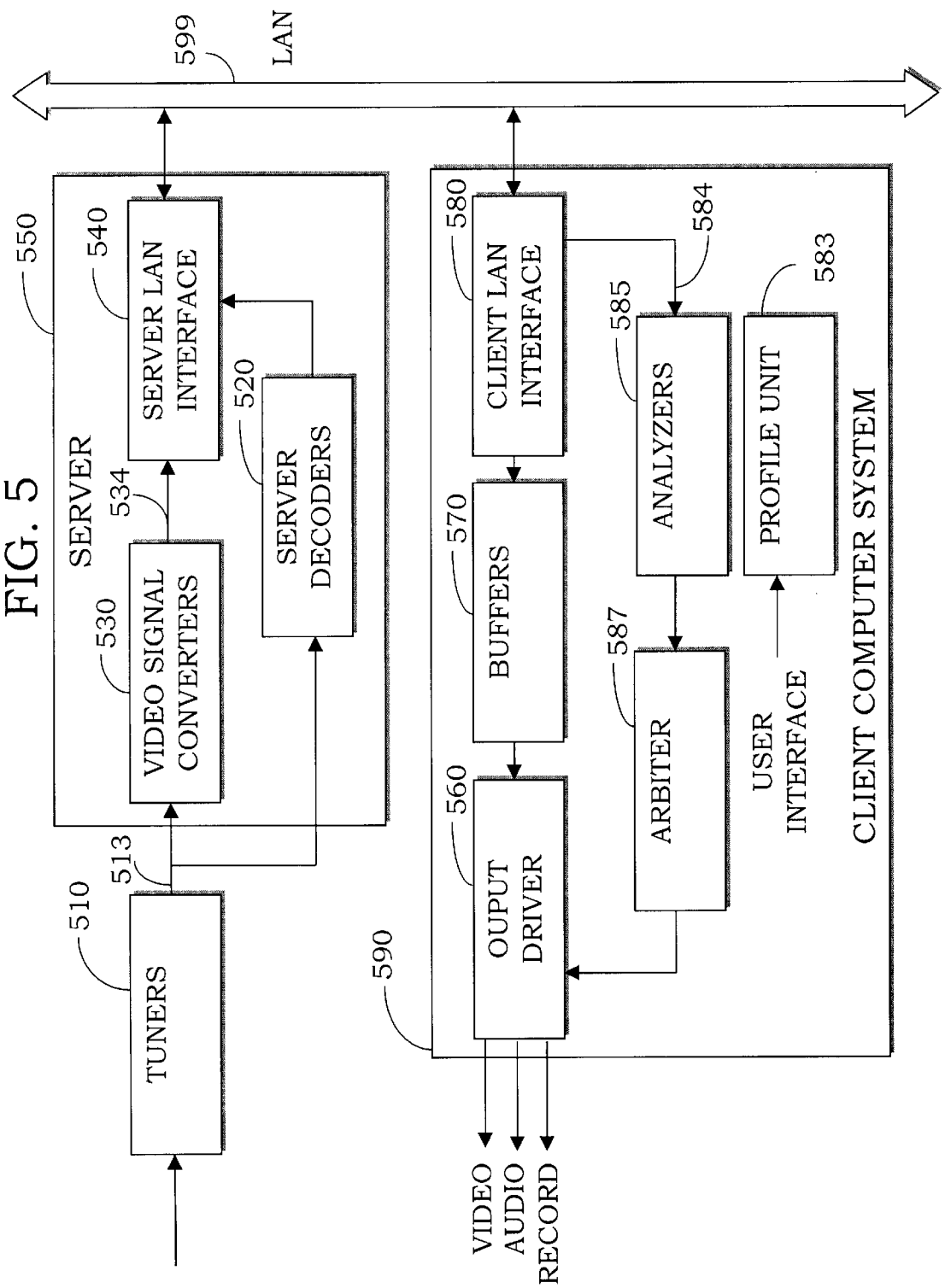

METHOD AND APPARATUS FOR CONTROLLING VIDEO/AUDIO AND CHANNEL SELECTION FOR A COMMUNICATION SIGNAL BASED ON CHANNEL DATA INDICATIVE OF CHANNEL CONTENTS OF A SIGNAL

RELATED APPLICATIONS

This application is a continuation of application Ser. No. 08/626,389, filed Mar. 29, 1996 abandoned, which is a continuation of prior filed pending application Ser. No. 8/338,429 filed Nov. 14, 1994 entitled A METHOD AND APPARATUS FOR MONITORING THE DATA CONTENT OF MULTIPLE TELEVISION CHANNEL, abandoned.

BACKGROUND OF THE INVENTION

(1) Field of the Invention

The present invention relates to the field of communications technology. More specifically, the present invention relates to monitoring the data content of multiple television channels.

(2) Description of Related Art

Current users of audio/video systems can view a broad spectrum of information including news broadcasts, sports events, etc. on a television set (TV). The same information shown on a TV can be recorded in a video cassette recorder (VCR) by the user. In most traditional televisions, the user can only watch one channel at a time, while in the more advanced picture-in-picture (PIP) televisions, the user can simultaneously watch two channels. In most of these traditional TVs, the user is typically limited to manually selecting channels and adjusting the audio volume associated with a channel. Even in the PIP television, the user still is limited to watching and listening to only one channel simultaneously.

To record a program in a VCR, the user is limited to either preprogramming the VCR to record a program using a time stamp to record the entire program without regards to the contents of the program, or manually setting record buttons on the VCR to record a program currently being watched by the user.

The proliferation of multimedia technology has enabled the incorporation of current TV technology into personal computers (PC) that allow the PC user to receive and display TV signals by incorporating a tuner and related TV circuitry. The multimedia PC could also be used to record TV signals. However, despite the new uses of TV technology, PC users who use their PCs as TV units still encounter the limitations imposed by traditional TVs (i.e., limited displays and sequentially viewing programs).

Furthermore, indiscriminately recording a program in a PC which normally does not include a VCR or equivalent recording register requires additional storage space especially if programs are recorded without regard to the contents of the program. The additional requirement for extra storage space for recording TV programs in these multimedia PC's can be very expensive since PC's typically utilize related expensive hard disk devices for bulk storage. Thus, it would be beneficial to efficiently utilize storage space needed to record a program being received by the PC.

To take advantage of the available audio/video technologies in a multimedia environment and permit monitoring multiple channels simultaneously and being able to discern information carried by each channel being monitored, a system is needed that will allow the user to capture and automatically display or record a video/audio signal based on the contents of the multiple channels.

Additionally, it is desirable to have a method and apparatus for monitoring for different types of information including numeric data, graphic image data and internet URL (Uniform Resource Locator) type data.

SUMMARY OF THE INVENTION

The present invention provides a communication system for controlling video/audio and channel selections in multiple channels of video/audio (television) signals based on the textual contents of the input information of the signal. The described embodiment includes a plurality of tuners that simultaneously receive the television signal having a plurality of channels and a plurality of decoding units for converting signals received by the tuning unit. The decoding unit generates a stream of text responsive to each signal provided by each tuning unit. The preferred embodiment of the present invention also includes an analyzing unit responsive to predefined user profile information and the decoded television signal, for determining whether a decoded signal includes information that matches the predefined profile information. The profile information includes a channel and a caption of key phases predefined by the user. Each channel is monitored by a tuning unit, decoded, and provided to the analyzing unit that searches the decoded information to detect these key phrases. For each channel being monitored, a channel priority is set so that when the analyzing unit detects that a channel being monitored has a predefined item of interest to the user, the detected information is passed on to an arbitrating unit to determine if the priority information is of a higher priority than a current channel being displayed.

BRIEF DESCRIPTION OF THE DRAWINGS

FIG. 3a is a block diagram illustrating one embodiment of information stored in the profile unit.

FIG. 3b block diagram illustrating an exemplary profile data in one embodiment of a user interface for the invention's numeric data type criteria, such as baseball.

FIG. 5 is a block diagram illustrating an exemplary local area network implementation of the signal processing system of one embodiment.

DETAILED DESCRIPTION OF THE PREFERRED EMBODIMENT

FIGS. 1 through 5 of the drawings disclose various embodiments of the present invention for purposes of illustration only. One skilled in the art will readily recognize from the following discussion that alternative embodiments of the structures and methods illustrated herein may be employed without departing from the principles of the invention.

Overview of the Computer System

Figure 1:
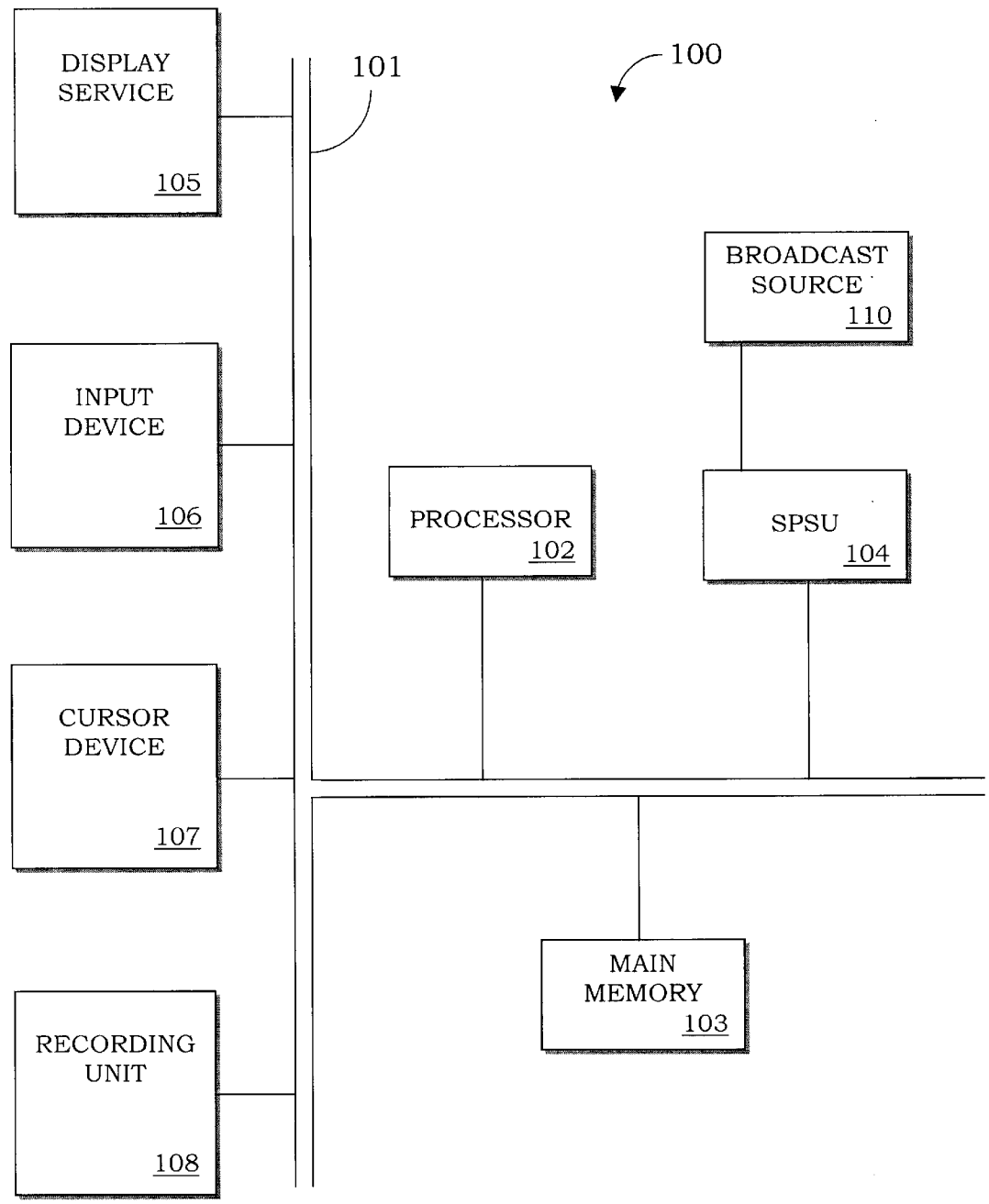
FIG. 1 is a block diagram illustrating an overview of a computer system utilized by one embodiment of the preferred embodiment.

Referring to FIG. 1, a block diagram illustrating a computer system as may be utilized by the preferred embodiment of the present invention is shown. The computer system 100 is a multimedia computer generally comprising a bus 101 for communicating information, a processor 102 coupled to the bus 101 for processing data and instructions, a main memory 103 coupled to the bus 101 for storing data and instructions for the processor 102 and other devices coupled to the bus 101, a signal processing and selection unit (SPSU) 104 coupled to the bus 101 for monitoring and selecting audio/video signals received by the computer system 100 from a signal broadcast source 110. Although the SPSU 104 is illustrated in a computer system, the SPSU 104 of the preferred embodiment may be embodied in a conventional television set or a video cassette recorder which includes components, such as the processor 102 and the main memory 103.

The computer system also comprises a display device 105 coupled to the bus 101 for displaying information to the computer user. The display device 105, which may be a conventional personal computer monitor, displays a plurality of digital images at any given time in multiple display windows in Windows™ or any other display application program. The computer system also comprises an alphanumeric input device 106 for communicating information and command selections to the processor 102, a cursor control device 107 also coupled to the bus 101 to allow the computer user to dynamically signal the two dimensional movement of a visible symbol on the display screen of the display device 105, and a recording unit 108 coupled to the bus 101 for optionally recording an audio/video signal received in the computer system 100 from a broadcast source 110.

Figure 2:
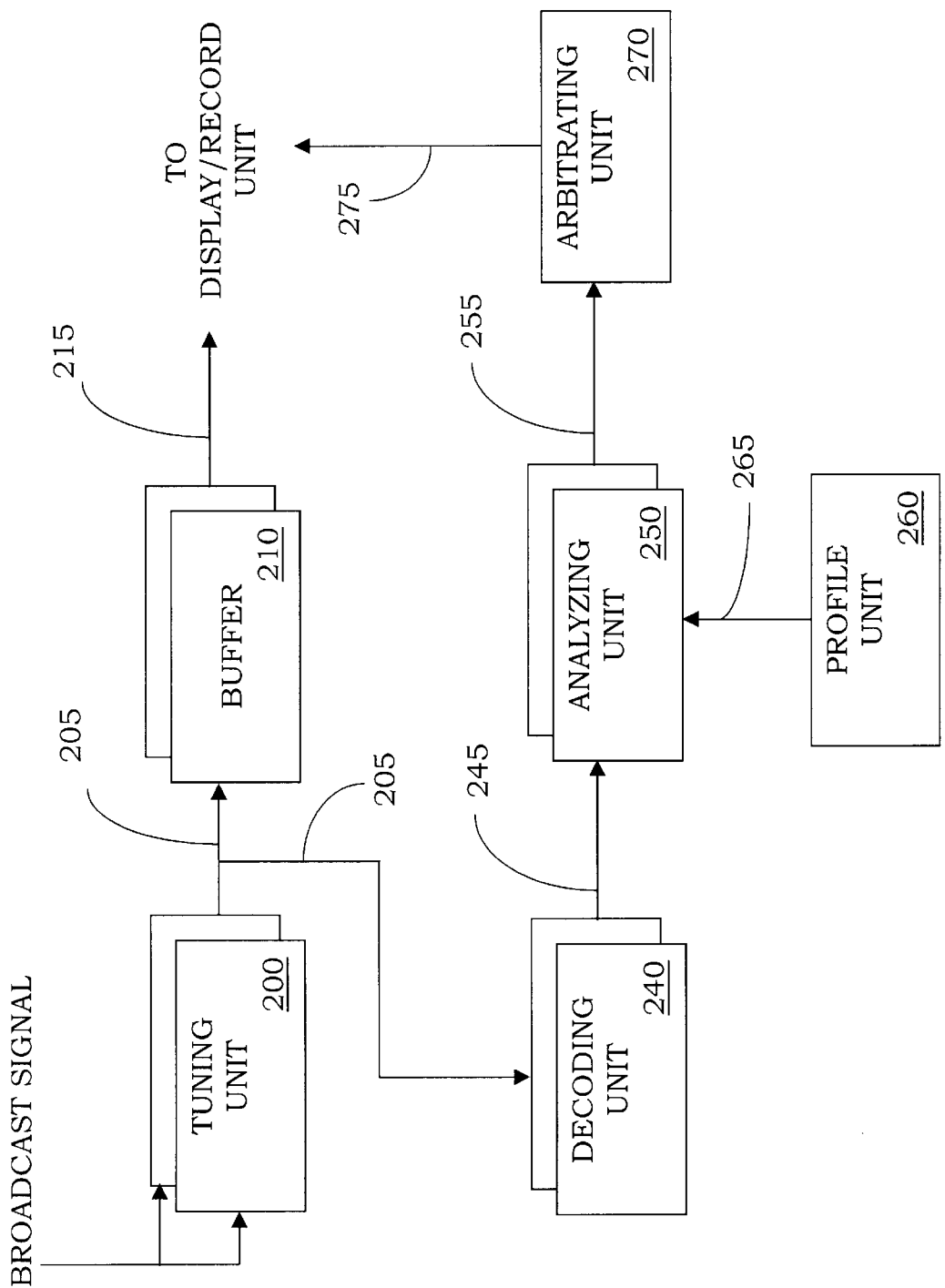
FIG. 2 is a block diagram illustrating one embodiment of the signal processing system for controlling and selecting audio/video signal in the preferred embodiment.

FIG. 2 illustrates an exemplary SPSU 104 comprising a plurality of tuning units 200 for receiving audio and video signals (television signals) and monitoring the available video signals for subsequent display in a display unit. Each of a plurality of buffer units 210 is coupled to each of the tuning units 200 for temporarily storing the television signals supplied by the tuning units 200 to the display/record unit. The display/record unit is utilized to display or record the television signals received by the communication unit. For example, the display/record unit shown in FIG. 2 may be a multimedia personal computer with multiple display windows, a television set screen capable of displaying multiple pictures, or a video cassette recorder.

The SPSU 104 further comprises a plurality of decoding units 240 coupled to the tuning units 200 via signal lines 205. The decoding unit 240 receives video signals from the tuning unit and converts (decodes) the signals into channel data streams. From the decoding units 240 decoded signals 245 are provided to a plurality of analyzing units 250. Responsive to the decoded signals 245 and predefined profile information, the analyzing units 250 determine whether the video signals being monitored by the tuning units 200 include predefined items of interest to the user. In one embodiment, analyzing units 250 are divided into analyzing units for different types of data including text analyzing unit 252, numeric analyzing unit 254, graphic image analyzing unit 256 and internet URL analyzing unit 258. The general steps followed in monitoring and analyzing the graphic image and internet URL type data are described in detail in the flow diagrams and the text accompanying the diagrams in FIGS. 4b and 4c. The analyzing units 250 are coupled to a profile unit 260 via lines 265. The profile unit 260 stores profile information that includes a prioritized list of predefined channels and channel data that specify items of interest to be monitored by the tuning units 200 and the decoding units 240.

The analyzing units 250 are also coupled to an arbitrating unit 270 via lines 255. The arbitrating unit 270 resolves display contentions between one or more analyzing units contending for the display/record unit when one or more predetermined items of interest are detected by the decoding units 240 and the analyzing units 250. From the arbitrating unit 270 selected signals 275 are provided to the display/record unit to display or record based on the user's profile information stored in the profile unit 260.

As an example of how SPSU 104 operates, the tuning units 200 receive video signals in a broadcast signal from a transmission source such as a television broadcasting station. The tuning unit 200 selects one channel out of several being broadcast and received by the preferred embodiment for display on the display unit. The tuning unit 200 also monitors the television signal being received by the preferred embodiment. After receiving the broadcast television signals, the tuning unit 200 generates output signals to the buffer 210 for temporary storage for the display unit and to the decoding unit 240 to be decoded.

The decoding unit 240 receives the monitored video signals from the tuning unit 200 and decodes (converts) the video signal into channel data indicative of the contents of the signals received by each channel being monitored. Decoding video signal is well known in the art and will not be discussed in detail. For example, many traditional televisions provide programs that are closed-captioned for the hearing impaired. The information transmitted to a closed-captioned television-according federal standards (USFCC regulations 47 C.F.R 73.682(a)(22))-is decoded into ASCII text by a decoder, such as a close-caption decoder available from EEG Technology, Inc., in the closed-captioned television and displayed on the television screen. Another method of decoding is using data transmitted in the vertical blank interval of a transmitted television signal or using speech to text conversion devices, both of which are well known in the art and will not be described in detail.

The decoded channel data information is supplied to the analyzing units 250 which determine whether a channel being monitored contains information of interest to the user. The analyzing unit 250 uses a user specified predefined list of data including "triggers" and items of channels stored in the profile unit 260 and the decoded channel data from the decoding unit 240 to determine which channels to display to the user. For example, the user may define a list of text of interest, such as monitoring the business channel so that anytime the word "Intel" is detected, the tuner automatically pre-empts the current channel being displayed. The list of data stored in the profile unit 260 is prioritized so that the user is not overwhelmed with various channels with predefined items of interest for the user to watch at the same time. Particularly, the arbitrating unit 270 includes logic to determine which one channel to display/record on the display/record unit at any particular time. The arbitration logic is described in detail with reference to FIG. 4a.

FIG. 3a is a block diagram illustrating an example of profile data in one embodiment of the profile unit 260. The profile unit comprises a priority storage location that stores priority data programmed by the user to prioritize each channel being monitored. When the priority data is set, channels with a high priority will always pre-empt channels with a lower priority in the display unit.

The profile unit 260 also includes a channel storage location for storing preprogrammed channel selections to be monitored by the preferred embodiment. The channel storage location is programmed using conventional channel programming methods known in the art. For example, if a particular user receives only a handful of channels, the user can program the channel storage locations of the profile unit with available channels received by the receiver unit. Channel reception and representation may differ from one location to the other. For example, the music television channel may be represented as channel 11 in one location, and as channel 20 in another. The profile unit 260 of the preferred embodiment allows the user the flexibility to reprogram channel selections in the channel storage location.

The profile unit 260 further includes a trigger storage location and action storage location, for storing items of interest corresponding to each pre-programmed channel and the particular action to take once the trigger item is detected. The user programs specifies items of interest that are monitored by the analyzing unit 250 for each channel. Once the analyzing unit 250 detects the trigger data, the analyzing unit 250 reads the action storage location to determine what action to take. The action taken by the analyzing unit 250 depends on the priority of the current channel in the display unit and the contents of the action location corresponding to the channel being monitored. For example, the user may program channel 44, which happens to be a business news channel (e.g. CNBC), with a priority of one and the trigger text as "Intel stock". With a priority of one, anytime the captioned text "Intel stock" is detected in the video signal for channel 44 by the analyzing unit 250, channel 44 pre-empts any channel currently being displayed in the display unit. The user can switch to a pre-empted channel after receiving the information in the preempting channel, or choose to display the preempting channel (i.e. channel 44). Note that in the preferred embodiment, preempting a channel and the subsequent action taken by the analyzing unit 250 is automatic and predefined.

In the preferred embodiment, the user can reprogram the contents of the profile unit 260. That is, the user can change the channel information, the priority numbers of the channels being monitored, or the triggering text for each channel being monitored as well as the action to take once a trigger item is detected.

FIG. 3b is a block diagram illustrating an exemplary profile data in one embodiment of a user interface for numeric criteria, such as baseball. As described earlier, the present invention is capable of monitoring different types of data including text, numeric, graphical image and internet URLs (Uniform Resource Locators). In this exemplary embodiment, an exemplary user interface is illustrated with a trigger portion having numeric criteria such. For example, in row 1, the trigger portion's criterion is to monitor for score where the sports being monitored for is baseball. Additional criteria include monitoring for portions of the program where team 1 has a score greater than 5 and/or team 2 has a score greater than 5.

Figure 4A:
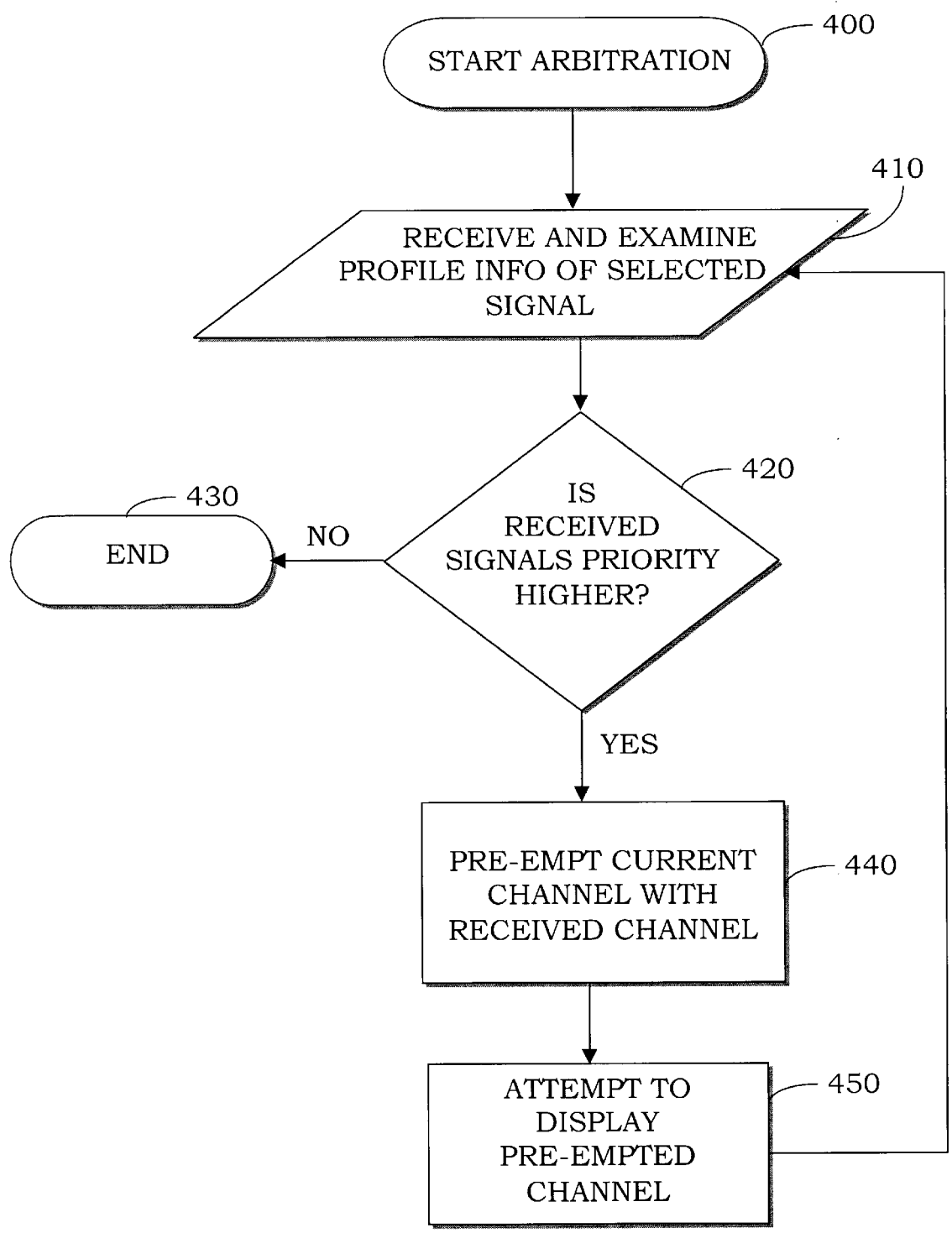
FIG. 4a is an exemplary flow chart illustrating the method of arbitration utilized by one embodiment of the arbitration unit.

Reference is now made to FIG. 4a which is a flow chart illustrating the arbitration logic utilized by the arbitration unit of the preferred embodiment. As illustrated in FIG. 4a, the arbitration logic starts at box 400 where the arbitrating unit 270 receives selected signals including the profile information from the analyzing unit 250.

At box 410, the arbitrating unit 270 receives and examines the contents of the profile information of a selected signal responsive to each channel being monitored from the analyzing unit 250. The profile information includes the priority, channel number and the action to be performed for each channel being monitored.

At box 420, the arbitrating unit 270 examines the selected signal to determine whether the priority information responsive to a channel information included in the selected signal is higher than a channel being displayed or recorded. If the priority of the selected signal is higher, processing continues at box 440; other processing continues at box 430 where the current arbitration process ends.

At box 440, if the priority of the selected signal is higher than the currently displayed channel, the arbitrating unit 270 instructs the display window to take action on the selected television signal to preempt a currently displayed window of a lower priority. For example, if the display unit has three channels with a priority of one, two and four being displayed, and the notified channel has a priority of three, the channel with a priority of four will be pre-empted. The same preemption logic applies if multiple channels are being recorded.

At box 450, once the arbitrating unit 270 has determined that a selected television signal supersedes a current displayed signal, the arbitrating unit 270 generates a notification signal to the pre-empted display to move to a different window if possible at box 410.

Figure 4B:
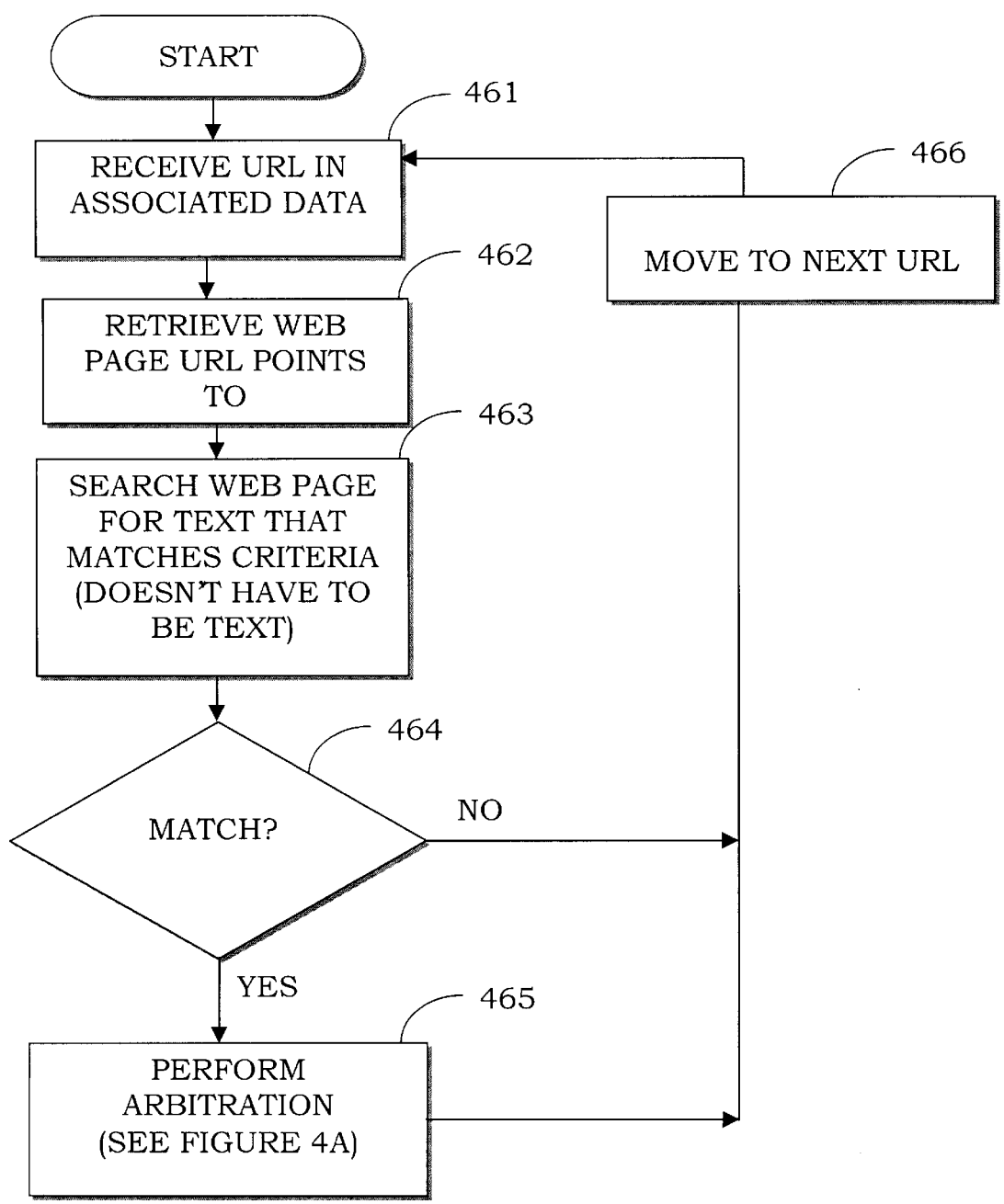
FIG. 4b illustrates the processing of one type of data, more specifically of internet URLs by the present invention.

FIG. 4b illustrates the processing of one type of data, more specifically of internet URLs by the present invention.

At box 461, an internet URL in the associated data is received. At box 462, the web page to which the received internet URL points is retrieved. At box 463, the web page retrieved is searched for data which matches the criterion specified by the corresponding triggering portion of the profile unit data. At box 564, if there is a match, then at box 565, arbitration is performed as was illustrated in the flow diagram in FIG. 4a. If there is no match, then at box 466, the next Internet URL to be examined is retrieved.

Figure 4C:
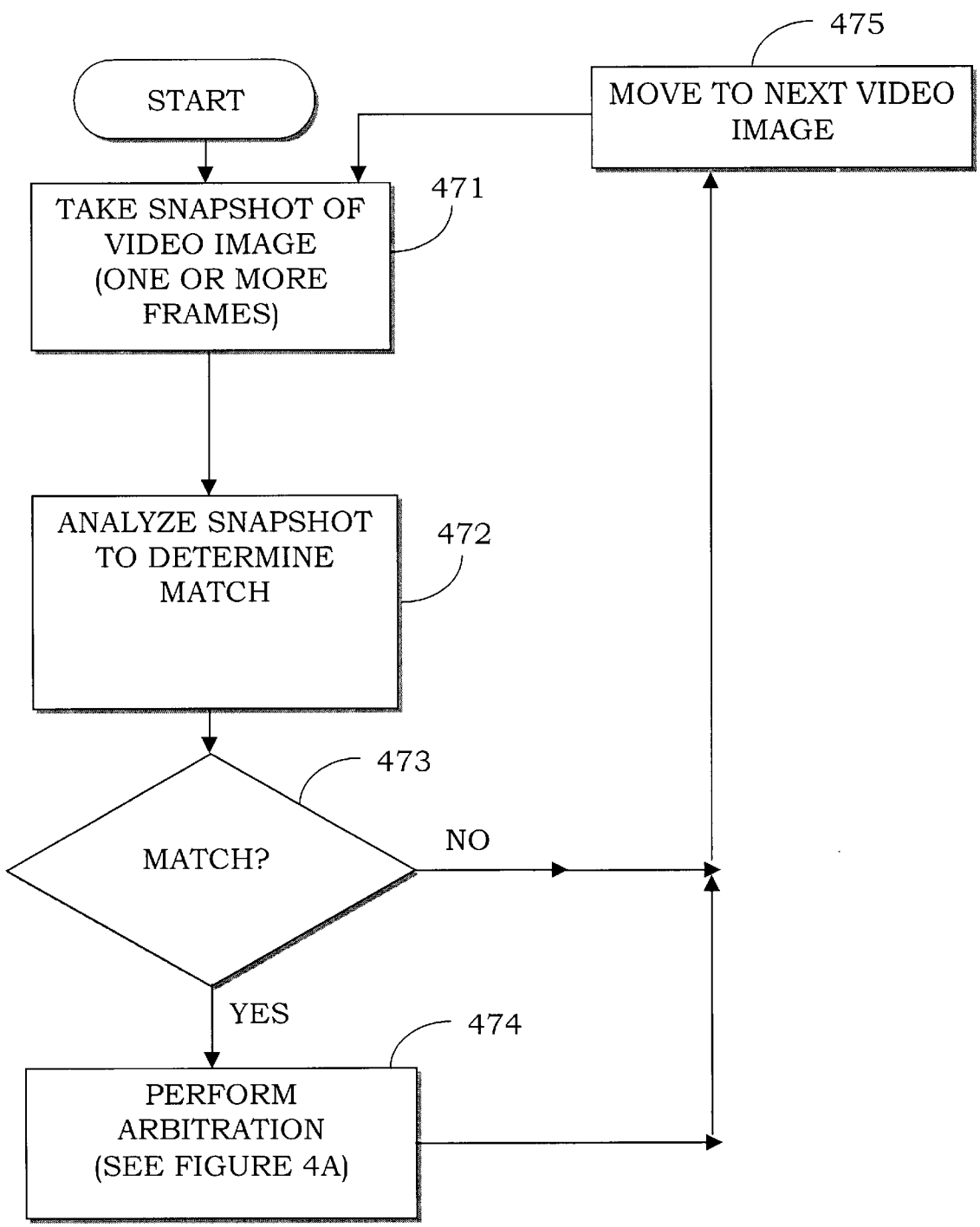
FIG. 4c illustrates the general steps followed in assessing video image match criteria.

FIG. 4c illustrates the general steps followed in assessing video image match criteria. At box 471, a snap shot of a video image (i.e., one or more frames) is taken. At box 472, the snap shot is analyzed to determine whether it matches a predetermined match criteria (i.e., as input by the user and stored in the profile unit). At box 473, if there is a match, then at box 474, arbitration is performed as was illustrated in FIG. 4a, else at box 475, the process moves to the next video image to analyze.

Reference is now made to FIG. 5 which illustrates an exemplary local area network (LAN) implementation of the preferred embodiment. As illustrated in FIG. 5, a client computer system 590 is coupled to a network server 550 via a local area network 599. The server 550 comprises a video signal converter 530 for converting video signals received by the server from a video transmission source such as a television broadcast station. The server 550 further comprises a plurality of server decoders 520 for decoding television signal received by the network server, a plurality of tuners 510 for receiving the television signal from a broadcast source, and a server LAN interface 540 for transmitting decoded television signal to the network. The computer system 590 comprises a client LAN interface 580 for interfacing the client computer 590 to the network, a plurality of buffers 570 for temporarily storing decoded television signal received by the client computer 590, a profile unit 583, a plurality of analyzers 585 for monitoring and selecting the television signal to be displayed in the client computer 590, an arbitrating unit 587 for arbitrating resource conflicts among the analyzers 585, and an output driver 560. In an alternate embodiment, the analyzers 585 and buffers 570 may be included in the server computer 550.

As illustrated in FIG. 5, the server 550 converts (decodes) a video signal in a receiving channel into a decoded digital format, and sends the converted signal over the LAN 599 to the receiving client computer 590. The server 550 further sends channel data indicative of the video signal received by the server 550 to the client computer system 590.

The video signal converted 530 receives a video signal from the tuner 510 responsive to a channel from an input signal line 513. The video signal converter 530 subsequently converts the video signal into a digital signal and transmits the converted signal to the server LAN interface 540.

The LAN interface 540 receives the channel data output from the server decoder 520 and the digital signal from the video signal converter 530 and transmits the decoded digital signal to the LAN 599. The protocol used by the LAN 599 is well known in the art and is not described in detail.

The interface between the client LAN interface 580 and the server LAN interface 540 is such that the client LAN interface 580 receives the assembled data from the server LAN interface 540 over the LAN 599, and disassembles the channel data output and the corresponding digital signal responsive to each channel. The client LAN interface 580 sends the digital signal to the buffer 570 for storage for a predetermined period of time, and the channel data output to the analyzer 585.

The analyzer 585 analyzes the textual output, and arbitrating unit 587 arbitrates resource contentions among analyzers finding matches, and sends control signals to the output driver 560 that controls the channel selection to the client computer. The analyzer 585 examines the channel data output from the client LAN interface 580 to determine whether a predefined pattern of interest is present for user viewing. If the predefined pattern is present, the analyzer 585 signals the detection, and arbitrating unit 587 sends control signals indicative of user commands to output driver 560. The output driver 560 receives control signals from the arbitrating unit 587, and outputs the television signals stored in the buffers 570 responsive to the control signals. The control signals indicate actions specified in a predefined user profile information, such as turning on and off a display window and adjusting audio volume in the client computer's display window in the client computer system 590.

Thus a method and apparatus for arbitrating between channels in a communication signal based on the textual data as well as numeric data, video image data and internet URL of the signal has been described. From the above description, it will be apparent that the invention disclosed herein provides a novel and advantageous communication system. The foregoing discussion discloses and describes exemplary methods and embodiments of the present invention. As will be understood by those familiar with the art, the invention may be embodied in other specific forms without departing from its spirit or essential characteristics, and thus, the described embodiment is not restrictive of the scope of the invention. The following claims are indicative of the scope of the invention. All variations which come within the meaning and range of equivalency of the claims are to be embraced within their scope.

What is claimed is:

1. An apparatus for controlling selective display and/or recording of selected ones of a plurality of channels of a communication signal, the apparatus comprising:
   (a) at least one analyzing unit for receiving channel data indicative of channel contents of the channels, and responsive thereto, analyzing the received channel data, including non-textual channel data, to determine if channel contents of said channels are among channel contents defined by selection data; and
   (b) an arbitrating unit coupled to said at least one analyzing unit to arbitrate display and/or recording resource contentions among said channels having channel contents that are defined by said selection data.

2. The apparatus of claim 1 wherein said arbitrating unit includes an arbitration logic routine for arbitrating said display and/or recording resource contentions, in accordance with predefined priority information of said selection data.

3. The apparatus of claim 1 further comprising one or more buffers coupled to said one or more tuning units for storing portions of the channel contents of said channels of said communication signal for a predetermined duration of time.

4. The apparatus of claim 1 wherein the channel contents of said channels include audio/video contents, and said selection data includes predefined priority of said audio/video contents.

5. The apparatus of claim 1 wherein said selection data includes predefined key data and priorities of said channels.

6. The apparatus of claim 1, wherein said arbitration unit automatically causes a display window for displaying the channel content of a successful one of said arbitrating channels to be activated, amplification of audio signals associated with the activated display window to be adjusted, and/or channel content of said successful one of said arbitrating channels to be recorded.

7. The apparatus of claim 1, wherein said at least one analyzing unit is equipped to perform said determination employing corresponding web pages of channel data that are uniform resource locators (URL).

8. The apparatus of claim 1, wherein said at least one analyzing unit is equipped to perform said determination with channel data that are video images.

9. The apparatus of claim 1, wherein said selection data include numerical expressions, and said at least one analyzing unit is equipped to perform said determination, including evaluation of said numeric expressions, using channel data that are numeric.

10. The apparatus of claim 1, wherein the apparatus further includes a profile unit coupled to said at least one analyzing unit for providing said at least one analyzing unit with said selection data.

11. The signal processing unit of claim 10 wherein said profile unit has a first state in which portions of said user data are added to storage locations of said profile unit, and a second state in which portions of said selection data are deleted from storage locations of said profile unit.

12. The apparatus of claim 7, wherein said apparatus is further equipped to cause a corresponding web page of a URL to be retrieved.

13. The apparatus of claim 12, wherein said apparatus is further equipped to recognize a URL.

14. The apparatus of claim 1 wherein the apparatus further includes one or more decoding units coupled to said at least one analyzing unit for providing said channel data to said at least one analyzing unit, said one or more decoding units receiving said channels of said communication signal, and in response generating said channel data.

15. The apparatus of claim 14, wherein the apparatus further includes one or more signal tuning units coupled to said one or more decoding units for providing said one or more decoding units with said channels, by tuning to said channels of said communication signal.

16. A computer system having a bus for communicating information, and a signal processing unit coupled to said bus for processing a signal having a plurality of channels, said signal processing unit comprising:
   (a) at least one analyzer for receiving channel data indicative of channel contents of said signal, and responsive thereto, analyzing said received channel data to determine if channel contents of said channels are among channel contents defined by selection data; and (b) an arbitration unit coupled to said at least one analyzer for arbitrating for display and/or record resource conflicts among said channels having channel contents defined by said selection data.

17. The computer system of claim 16 further comprising a display unit coupled to said arbitrating unit, including a plurality of display windows for displaying channel contents of successful ones of said arbitrating channels of said signal under the control of said arbitrating unit.

18. The computer system of claim 16 wherein said selection data include priorities of selected ones of said channels of said signal.

19. The computer system of claim 16, wherein the computer system further includes a profile unit coupled to said at least one analyzer for providing said at least one analyzer with said selection data.

20. The computer system of claim 16 wherein said arbitration unit automatically causes a display window to be activated for displaying channel content of a successful one of said arbitrating channels, amplification of audio signals associated with said display window to be adjusted, and/or the channel contents of a successful one of said arbitrating channels to be recorded.

21. The computer system of claim 19 wherein said profile unit includes a first and a second portion, and wherein said first portion is defined to store information about selected ones of said channels, and said second portion is defined to store information about successful ones of said arbitrating channels.

22. The computer system of claim 16 further comprising one or more recorders coupled to said arbitrating unit for recording the channels contents of one or more successful ones of said arbitrating channels, under the control of said arbitrating unit.

23. The computer system of claim 16, wherein said at least one analyzing unit is equipped to perform said determination employing corresponding web pages of channel data that are uniform resource locators (URL).

24. The computer system of claim 23, wherein said computer system is further equipped to cause a corresponding web page of a URL to be retrieved.

25. The computer system of claim 24, wherein said computer system is further equipped to recognize a URL.

26. The computer system of claim 16, wherein said at least one analyzing unit is equipped to perform said determination employing channel data that are video images.

27. The computer system of claim 16, wherein said selection data include numerical expressions, and said at least one analyzing unit is equipped to perform said determination, including evaluation of said numeric expressions using channel data that are numeric.

28. The computer system of claim 16, wherein the computer system further includes one or more decoders coupled to said at least one analyzer for providing said channel data to said at least one analyzer, said one or more decoders receiving said channels, and in response generating said channel data.

29. The computer system of claim 28, wherein the computer system further includes one or more tuners coupled to said one or more decoders for providing said one or more decoders with said channels, by tuning to said channels of said signal.

30. The computer system of claim 19 wherein said profile unit has a first state in which portions of said selection data are added to storage locations of said profile unit, and a second state in which portions of said selection data are deleted from storage locations of said profile unit.

31. A communication network system comprising:
(a) a communication network interface for communicating in said communication network system;
(b) a communication network server coupled to said communication network interface for receiving a signal having a plurality of channels; said communication network server generating channel data indicative of channel contents of said channels; and
(c) a client computer system coupled to said communication network interface for receiving said channels and said channel data from said network server, analyzing said received channel data to determine if channel contents of said channels are among channel contents defined by selection data, and arbitrating display and/or recording resource conflicts among channels having channel contents defined by the selection data.

32. The communication network system of claim 31 wherein said communication network server comprises:
(b.1) one or more tuners for tuning to said channels;
(b.2) one or more decoders coupled to said one or more tuners to receive said channels; and to generate said channel data;
(b.3) one or more buffers coupled to said one or more tuners for temporarily storing portions of the channel contents of said channels for a predetermined duration of time; and
(b.4) a server interface coupled to said buffers and said decoders for coupling said communication network server to said communication network interface.

33. The communication network system of claim 31 wherein said client computer system comprises:
(c.1) at least one analyzer coupled to said communication network interface for receiving and analyzing said channel data to determine whether said channel contents are among channel contents defined by said selection data; and
(c.2) an arbitration unit coupled to said at least one analyzer for performing said arbitration.

34. A method for controlling rendering of a signal having a plurality of channels, said method comprising the steps of:
(a) analyzing channel data indicative of channel contents of the channels to determine whether channel contents of said channels are among channel contents defined by selection data; and
(b) arbitrating display and/or recording resource contentions among said channels having channel contents that are defined by the selection data.

35. The method of claim 34, wherein step (a) further comprises causing a corresponding web page of a URL to be retrieved.

36. The method of claim 35, wherein step (a) further comprises recognizing a URL.

37. The method of claim 34, wherein step (a) further includes generating said channel data and providing said channel data to said at least one analyzer.

38. An apparatus comprising:
(a) one or more decoders for receiving a signal having a plurality of channels and generating channel data representing channel contents of the channels, including decoding uniform resource locators (URLs) included in some of said channels; and
(b) at least one analyzer coupled to the one or more decoders for analyzing said channel data to determine if said represented channel contents are among channel contents defined by selection data, including analyzing corresponding web pages of channel data that are URLs.

39. A computer system comprising:
(a) at least one analyzer for analyzing channel data representing channel contents of channels of a signal to determine if channel contents of said channels are among channel contents defined by selection data, including analyzing corresponding web pages of said channel data that are uniform resource locators (URLs); and
(b) a display/recording unit coupled to the at least one analyzer for displaying and/or recording channel contents of said channels that are among channel contents defined by the selection data.

40. A method comprising the steps of:
(a) receiving a signal having a plurality of channels, and generating channel data representing channel contents of the channels, including decoding uniform resource locators (URLs) included in some of said channels; and
(b) analyzing said channel data to determine if channel contents of said channels are among channel contents defined by selection data, including analyzing corresponding web pages of channel data that are URLs.

41. An apparatus comprising:
(a) one or more decoders for receiving a signal having a plurality of channels and generating channel data representing channel contents of the channels, including taking snapshots of video images of said channels; and
(b) at least one analyzer coupled to the one or more decoders for analyzing said channel data to determine if said represented channel contents are among channel contents defined by selection data, including analyzing said video image snapshots taken.

42. A computer system comprising:
(a) at least one analyzer for analyzing channel data representing channel contents of channels of a signal to determine if channel contents of said channels are among channel contents defined by selection data, including analyzing video image snapshots taken of said channels; and
(b) a display/recording unit coupled to the at least one analyzer for displaying and/or recording channel contents of said channels that are among channel contents defined by the selection data.

43. A method comprising the steps of:
(a) receiving a signal having a plurality of channels, and generating channel data representing channel contents of the channels, including taking snapshot of video images of said channels; and
(b) analyzing said channel data to determine if channel contents of said channels are among channel contents defined by selection data, including analyzing said video image snapshots taken.

44. An apparatus comprising:
(a) one or more decoders for receiving a signal having a plurality of channels and generating channel data representing channel contents of the channels, including decoding numeric data included in some of said channels; and
(b) at least one analyzer coupled to the one or more decoders for analyzing said channel data to determine if said represented channel contents are among channel contents defined by selection data, including evaluating numerical expressions of said selection data using said decoded numeric data.

45. A computer system comprising:
(a) at least one analyzer for analyzing channel data representing channel contents of channels of a signal to determine if channel contents of said channels are among channel contents defined by selection data, including evaluating numeric expressions of said selection data for channel data that are numeric; and
(b) a display/recording unit coupled to the at least one analyzer for displaying and/or recording channel contents of said channels that are among channel contents defined by the selection data.

46. A method comprising the steps of:
(a) receiving a signal having a plurality of channels, and generating channel data representing channel contents of the channels, including decoding numeric data included for some of said channels; and
(b) analyzing said channel data to determine if channel contents of said channels are among channel contents defined by selection data, including evaluating numeric expressions of said selection data for said channel data that are numeric.

* * * * *